United States Patent [19]
Yokoyama et al.

[11] Patent Number: 5,678,060
[45] Date of Patent: Oct. 14, 1997

[54] SYSTEM FOR EXECUTING HIGH SPEED COMMUNICATION PROTOCOL PROCESSING BY PREDICTING PROTOCOL HEADER OF NEXT FRAME UTILIZING SUCCESSIVE ANALYSIS OF PROTOCOL HEADER UNTIL SUCCESSFUL HEADER RETRIEVAL

[75] Inventors: Tatsuya Yokoyama, Sagamihara; Tetsuhiko Hirata, Yokohama; Mika Mizutani, Tokyo; Osamu Takada, Sagamihara, all of Japan

[73] Assignee: Hitachi, Ltd., Tokyo, Japan

[21] Appl. No.: 331,106

[22] Filed: Oct. 28, 1994

[30] Foreign Application Priority Data

Oct. 28, 1993 [JP] Japan .................. 5-270254

[51] Int. Cl.⁶ .............. G06F 3/00; G06F 15/16; G06F 15/56
[52] U.S. Cl. .............. 395/831; 395/200.01; 395/821
[58] Field of Search .............. 395/821, 200.01, 395/831

[56] References Cited

U.S. PATENT DOCUMENTS

| | | | |
|---|---|---|---|
| 4,430,710 | 2/1984 | Catiller et al. | 364/200 |
| 4,442,502 | 4/1984 | Friend et al. | 364/900 |
| 4,471,427 | 9/1984 | Harris | 364/200 |
| 4,868,738 | 9/1989 | Kish et al. | 364/200 |
| 5,056,058 | 10/1991 | Hirata et al. | 364/900 |
| 5,175,825 | 12/1992 | Starr | 395/325 |
| 5,260,942 | 11/1993 | Auerbach et al. | 370/94.1 |
| 5,452,295 | 9/1995 | Nakagaki et al. | 370/58.2 |

*Primary Examiner*—Thomas C. Lee
*Assistant Examiner*—Rehana Perveen Krick
*Attorney, Agent, or Firm*—Antonelli, Terry, Stout & Kraus, LLP.

[57] ABSTRACT

Communication control equipment for connecting a computer system to a network and supporting the computer system to set a plurality of connections on the network and perform parallel communication between computers. The communication control equipment includes an interface circuit for the computer system, a microprocessor for performing communication control processing, a local memory for storing programs and work data, a buffer memory for temporarily storing transmission and reception data, a DMA transfer unit for performing data transfer between a memory in the computer system and the buffer memory and protocol header transfer between the buffer memory and the local memory, a network controller for controlling transmission and reception of data to the network, and a header retrieval unit for predicting a protocol header of a frame to be next received in correspondence to each of a plurality of connections and retrieving a header corresponding to a protocol header of a received frame transferred by the DMA transfer unit.

4 Claims, 18 Drawing Sheets

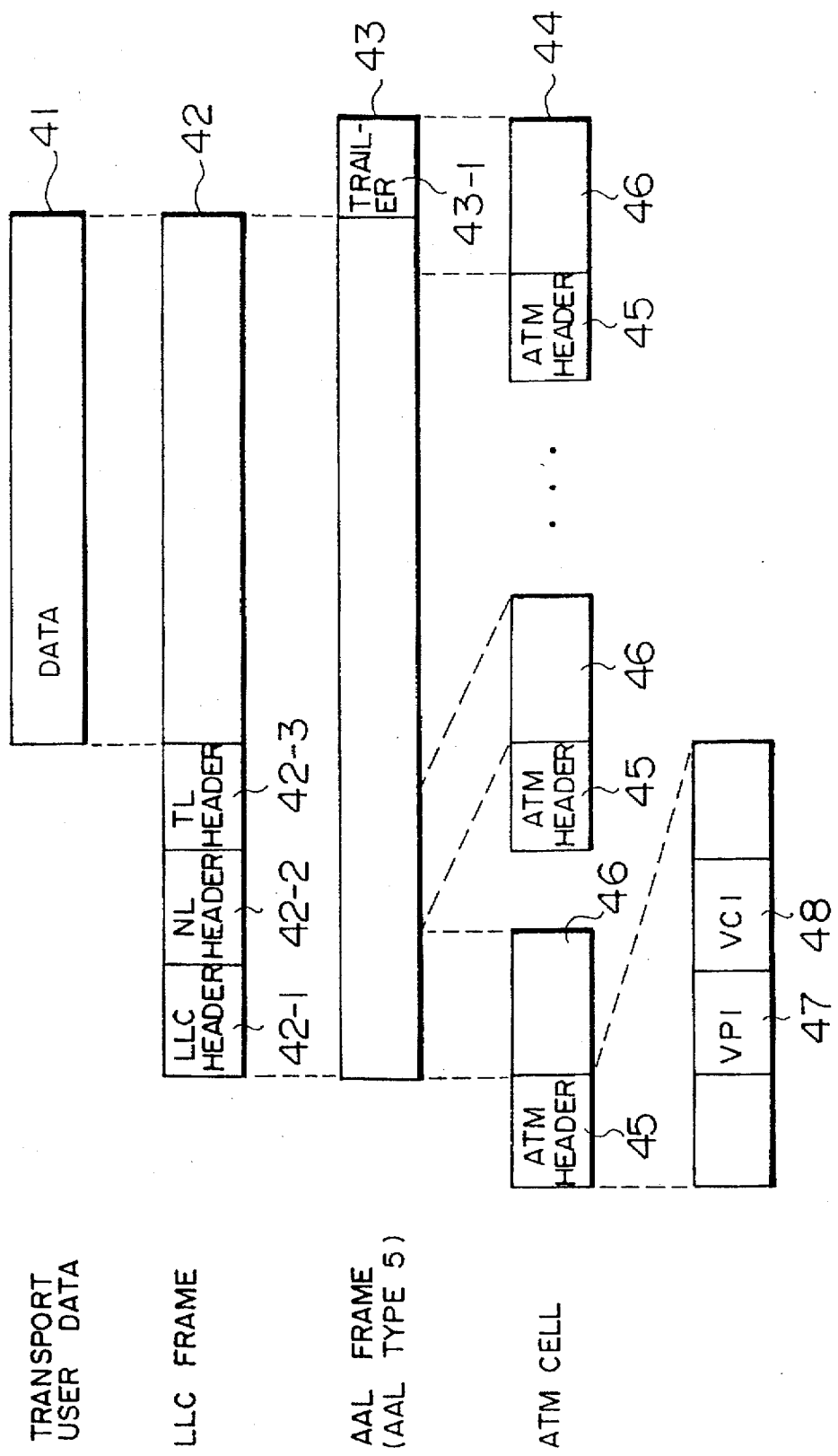

FIG. 5A TL HEADER (TP4)

| | 2 | 3~4 | 5~6 | 7 | 8~k | |
|---|---|---|---|---|---|---|
| CR | U | CR CODE | CDT | DST-REF | SRC-REF | CLASS OPTION | VARIABLE PORTION | USER DATA (32 OCTETS OR LESS) | 700 |

FIG. 5B TL HEADER (TP4)

| | 2 | 3~4 | 5~6 | 7 | 8~k | |
|---|---|---|---|---|---|---|
| CC | U | CC CODE | CDT | DST-REF | SRC-REF | CLASS OPTION | VARIABLE PORTION | USER DATA (32 OCTETS OR LESS) | 701 |

FIG. 5C TL₂ HEADER (TP4)

| | 2 | 3~4 | 5 | 6~k | |
|---|---|---|---|---|---|
| DT | U | DT CODE | '0' DST-REF | TPDU-NR | VARIABLE PORTION | USER DATA | 702 |

FIG. 5D TL HEADER (TP4)

| | 2 | 3~4 | 5 | 6~k | |
|---|---|---|---|---|---|
| AK | U | AK CODE | CDT | DST-REF | YR-TU-NR | VARIABLE PORTION | 703 |

FIG. 5E TL HEADER (TP4)

| | 2 | 3~4 | 5~6 | 7 | 8~k | |
|---|---|---|---|---|---|---|
| DR | U | DR CODE | '0' DST-REF | SRC-REF | REASON CODE | VARIABLE PORTION | USE DATA (64 OCTETS OR LESS) | 704 |

FIG. 5F TL HEADER (TP4)

| | 2 | 3~4 | 5~6 | 7~k | |
|---|---|---|---|---|---|
| DC | U | DC CODE | '0' DST-REF | SRC-REF | VARIABLE PORTION | 705 |

FIG. 5G NL HEADER (CLNP)

| | 2 | 3 | 4 | 5 | 6~7 | 8~9 | 10 | 11~h | h+1 | h+2~i | i+1~j | |
|---|---|---|---|---|---|---|---|---|---|---|---|---|
| DT | PID | HEADER LENGTH | VER | LIFE TIME | DT CODE | SEGMENT LENGTH | CHECK SUM | DA LENGTH | DNSAP | SA LENGTH | SNSAP | VARIABLE PORTION | USER DATA | 706 |

FIG. 5H LLC HEADER

| | 2 | 3 | |
|---|---|---|---|
| UI | DSAP | SSAP | CTL | USER DATA | 707 |

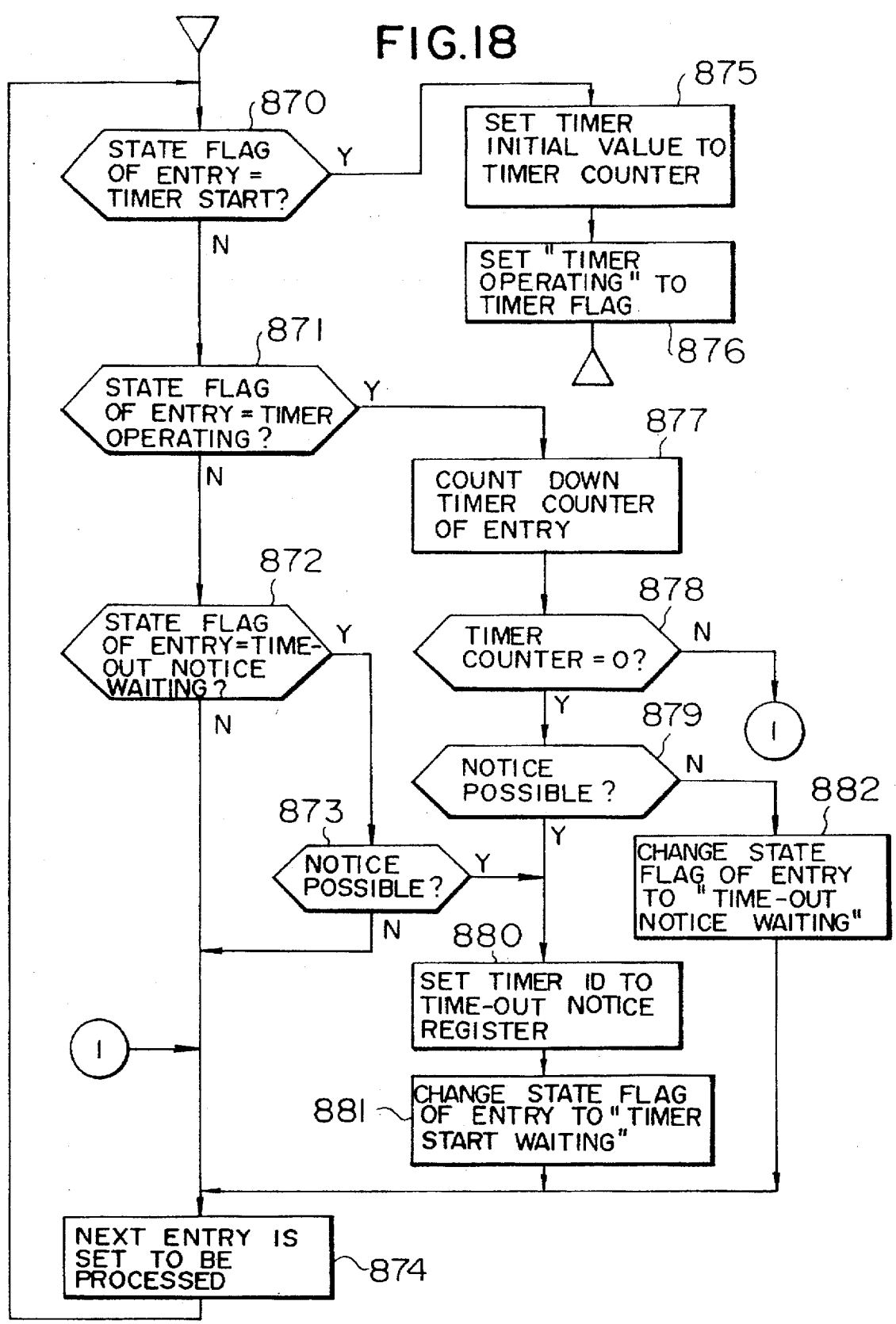

SYSTEM FOR EXECUTING HIGH SPEED COMMUNICATION PROTOCOL PROCESSING BY PREDICTING PROTOCOL HEADER OF NEXT FRAME UTILIZING SUCCESSIVE ANALYSIS OF PROTOCOL HEADER UNTIL SUCCESSFUL HEADER RETRIEVAL

BACKGROUND OF THE INVENTION

The present invention relates to communication control equipment and a communication control circuit for connecting a computer to a network, and more particularly to communication control equipment and an integrated circuit for communication control for performing parallel data communication between computers to communicate through a plurality of connections.

In the environment in which a computer requires a plurality of connections on a network to perform a plurality of communications in parallel, for example, the communication processing in which a server computer constituting a server client system performs to a plurality of clients, a high-speed technique of protocol processing is important. In this case, as subjects of the protocol processing, there are high-speed operation of analysis processing of a protocol header in a receiving process and high-speed operation of timer control processing.

The technique for performing the analysis processing of the protocol header in reception of data at a high speed is disclosed in U.S. Pat. No. 5,056,058 issued to applicants who are also applicants of the present application, though not inclusively. In the system disclosed in U.S. Pat. No. 5,056,058, instead of successively analyzing the protocol header composed of a plurality of header elements in a received frame for each header element, a protocol header of one or a plurality of layers of a frame to be successively received is predicted on the basis of the header of the frame received before or sent by its own station and when the frame is actually received, a header of the received frame and the predicted header are compared with each other to thereby perform the header analysis processing at a high speed.

Further, U.S. Pat. No. 5,303,344 which is a continuation-in-part of the above U.S. Pat. No. 5,056,058 discloses communication control equipment connected between a computer system and a communication line to perform protocol processing at a high speed, comprising:

a buffer memory connected between a computer interface circuit and a communication line interface circuit through a first path for data transfer to store communication data temporarily; and a protocol processor connected between the computer interface means and the communication line interface means through a second path for control information transfer and connected to the buffer memory means through a third path to perform protocol processing on the communication data within the buffer memory;

the protocol processor comprising:

a plurality of processor units connected to the second path in series to each other and each responsive to the control information received from the second path to access the buffer memory through the third path, for performing a first category of protocol processing necessary for normal data transfer of the communication data stored in the buffer memory and for transferring the control information to the third path if protocol processing other than the first category of protocol processing is necessary for the communication data; and a second processor connected to the third path for performing protocol processing other than the first category of protocol processing on the communication data stored in the buffer memory means in response to the control information received from the third path and serving as a backend processor of the processor unit.

On the other hand, as the technique for reducing a load of a processor in relation to the timer control processing, there is a "timer control apparatus" described in JP-A-3-209512, for example. In the invention described in the Publication, a processor dedicated to timer processing is provided separately from the processor for performing communication control processing to thereby exclude the timer control processing from the primary processor for performing communication control processing.

However, when the header prediction system disclosed in the U.S. Pat. No. 5,056,058 is adopted in the environment in which a multiplicity of connections are set, a plurality of prediction headers are defined corresponding to each of the connections and it is necessary to successively compare the received protocol header with the plurality of prediction headers in order to specify a prediction header corresponding to the protocol header of the received frame (or packet) from the plurality of prediction headers, so that there remains room for improvement in respect to the highspeed operation.

Further, in the load reduction system for the timer control described in the JP-A-3-209512, a load for the timer control processing can be excluded from the primary processor for performing communication control processing whereas it is necessary to provide a processor dedicated to the timer control and accordingly there is a problem that the hardware configuration is complicated.

SUMMARY OF THE INVENTION

It is an object of the present invention to provide a communication control equipment capable of performing protocol processing at a high speed in an environment in which a multiplicity of connections are set.

It is another object of the present invention to provide communication control equipment capable of performing analysis processing of a protocol header in the environment in which a multiplicity of connections are set.

It is a further object of the present invention to provide communication control equipment capable of reducing a load of a processor for timer control processing in which a processing amount is increased in proportion to the number of connections to be set.

It is another object of the present invention to provide circuit apparatus for configuring a high-performance communication control equipment to be compact.

In order to achieve the above objects, communication control equipment according to the present invention comprises an interface circuit for a higher-rank computer, a microprocessor for performing communication control processing, a local memory for storing programs and work data, a buffer memory for temporarily storing transmission and reception data, DMA transfer means for performing data transfer between a memory in the higher-rank computer and the buffer memory and protocol header transfer between the buffer memory and the local memory, a network controller for controlling transmission and reception of data to the network, and header retrieval means for predicting a protocol header of a frame to be next received in correspondence to a connection and retrieving a header corresponding to a protocol header of a received frame transferred by the DMA transfer means.

Further, the communication control equipment of the present invention comprises, in addition to the above configuration or instead of the header retrieval means, memory means including a plurality of timer entries, each entry holding information necessary for timer control and timer means for performing timer count operation and timer notifying operation to the processor for the plurality of timer entries of the memory means.

According to a preferred embodiment of the present invention, the prediction header retrieval means, the DMA transfer means and the timer means are provided by an LSI form on a single semiconductor substrate together with an interface for the network, an interface for an internal bus connected to the processor of the communication control equipment, an interface for the local memory of the communication control equipment and an interface for a system bus of the higher-rank apparatus.

According to the present invention, the analysis processing of the protocol header can be performed by the retrieval means and the DMA transfer means at a high speed even when there are a plurality of connections. Further, when a hardware timer is added thereto, a load for timer control increased in proportion to the number of connections can be released from the communication control processor.

BRIEF DESCRIPTION OF THE DRAWINGS

FIG. 4 shows a format of a communication frame transmitted and received between the various communication control equipment;

FIGS. 5A-5H are diagrams showing formats of protocol headers;

FIG. 18 is a flow chart showing operation of the timer circuit.

DESCRIPTION OF THE PREFERRED EMBODIMENT

An embodiment of the present invention is now described with reference to the accompanying drawings.

Figure 2:
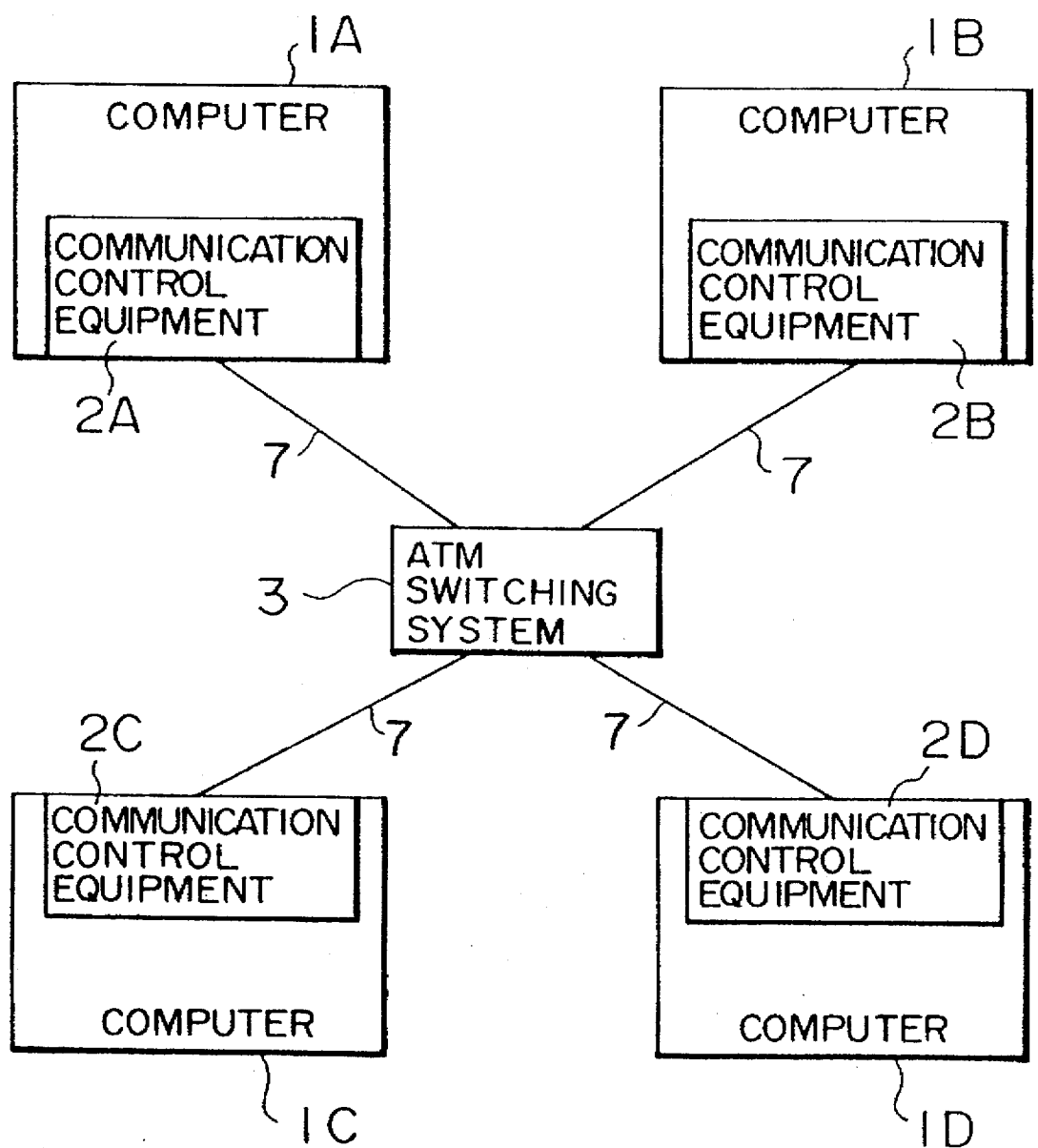
FIG. 2 is a schematic diagram illustrating a network system to which the present invention is applied.

FIG. 2 schematically illustrates an example of a communication network system to which a communication control equipment of the present invention is applied. Numeral 1 (1A to 1D) denotes computers, which are connected through communication control equipment 2 (2A to 2D) and ATM (Asynchronous Transfer Mode) transmission paths 7, respectively, to an ATM switching system 3.

Figure 1:
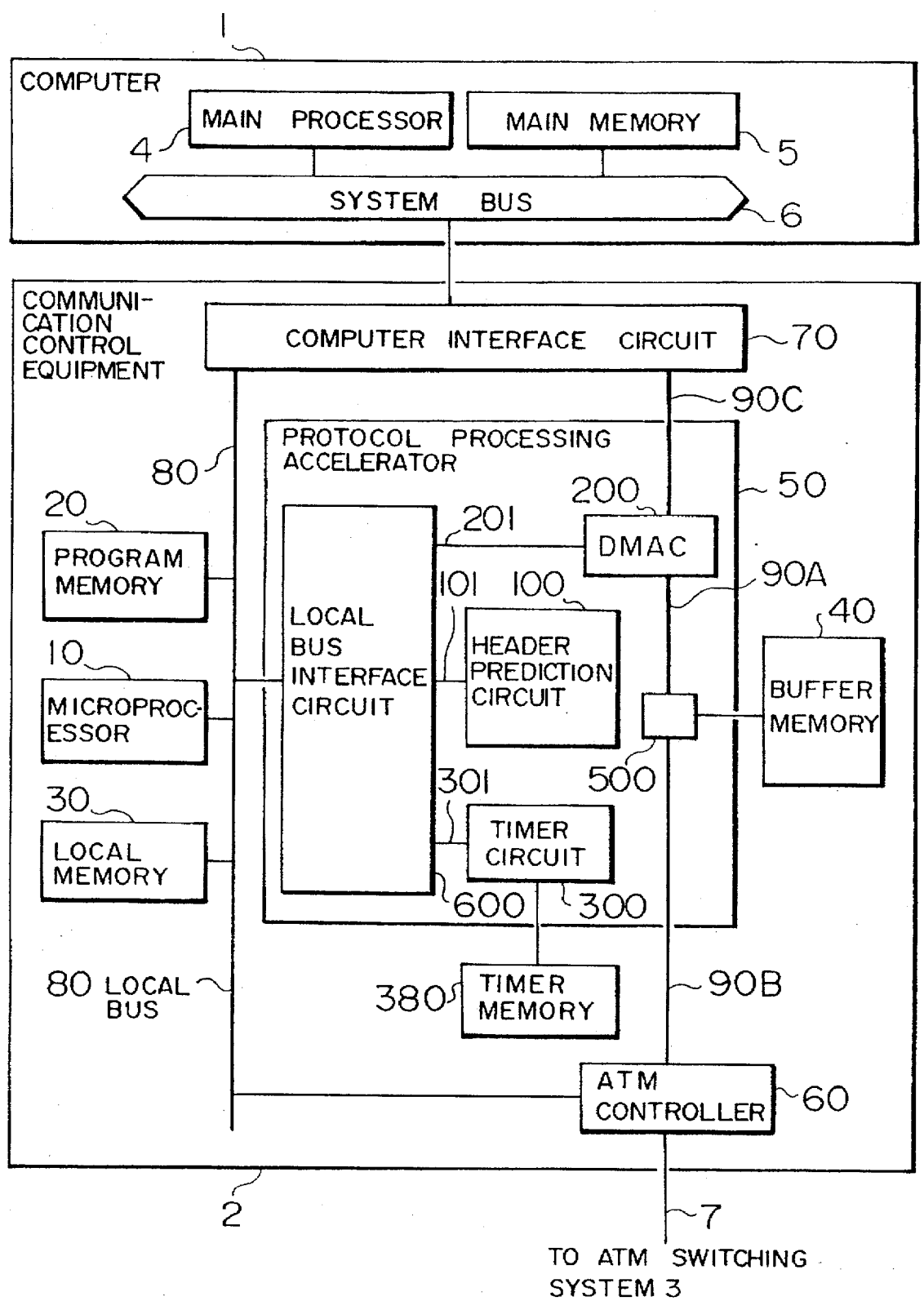
FIG. 1 is a block diagram schematically illustrating communication control equipment of the present invention.

FIG. 1 schematically illustrates an example of the communication control equipment 2. A higher-rank computer 1 comprises a main processor 4 and a main memory 5 connected to a system bus 6. The communication control equipment 2 is connected to the system bus 6 and comprises a microprocessor 10 for performing communication control processing such as protocol processing, a program memory 20, a local memory 30, a protocol processing accelerator 50 which constitutes a main portion of the present invention, a buffer memory 40 for temporarily storing data to be transmitted and data that is received, an ATM controller 60 for controlling transmission and reception of data to the ATM transmission path 7, and a computer interface circuit 70.

The ATM controller 60 functions to divide data (frame) to be transmitted having a variable length and stored in the buffer memory 40 into a plurality of mini-packets (hereinafter referred to as cells) having a fixed length to transmit the cells to the ATM transmission path 7 and transfer cells received from the ATM transmission path 7 to the buffer memory 40 to assemble the received cells into a received frame. The ATM controller 60 can be realized by using, for example, a SARA chip set of Transwitch Inc.

The protocol processing accelerator 50 is a hardware for accelerating protocol processing by the microprocessor 10 and comprises a DMA controller 200 (hereinafter referred to as DMAC) for transferring transmission and reception data and a protocol header, a header prediction circuit 100 for analyzing received protocol header at a high speed, a timer circuit 300 for controlling a multiplicity of timers, a buffer access arbiter circuit 500 and a local bus interface circuit 600.

The DMAC 200 possesses transfer function of transmission and reception data between the main memory 5 in the higher-rank computer 1 and the buffer memory 40 (hereinafter referred to as data DMA function) and transfer function of a protocol header between the local memory 30 and the buffer memory 40 (hereinafter referred as header DMA function).

The header prediction circuit 100 is a circuit having a function of taking in received headers transferred from the buffer memory 40 to the local memory 30 by means of the header DMA function of the DMAC 200 to retrieve a header coincident with a plurality of previously registered prediction headers at a high speed.

The timer circuit 300 is a hardware timer for controlling a plurality of timers of the order of several hundreds to several thousands, and information necessary for the timer control is stored in a timer memory 380.

The buffer access arbiter circuit 500 is a circuit for arbitrating accesses from the DMAC 200 and the ATM controller 60 to the buffer memory 40.

The communication control equipment 2 includes internal buses of two systems. One of the buses is a data bus 90 (90A, 90B and 90C) for transferring transmission and reception data and the other is a local bus 80 connected to the microprocessor 10 for communication control processing.

When the microcomputer 10 in the communication control equipment 2 receives a data transmission request from the computer 1, the microprocessor 10 utilizes the DMAC 200 to transfer data to be transmitted or transmission data stored in the main memory 5 to the buffer memory 40. The transmission data is subjected to protocol processing and the ATM controller 60 is then started to send a frame to the ATM transmission path 7. On the other hand, when a frame reception notice is received from the ATM controller 60, protocol processing is performed and the DMAC 200 is then utilized to transfer received data to the main memory 5 and notify data reception to the computer 1.

Figure 3:
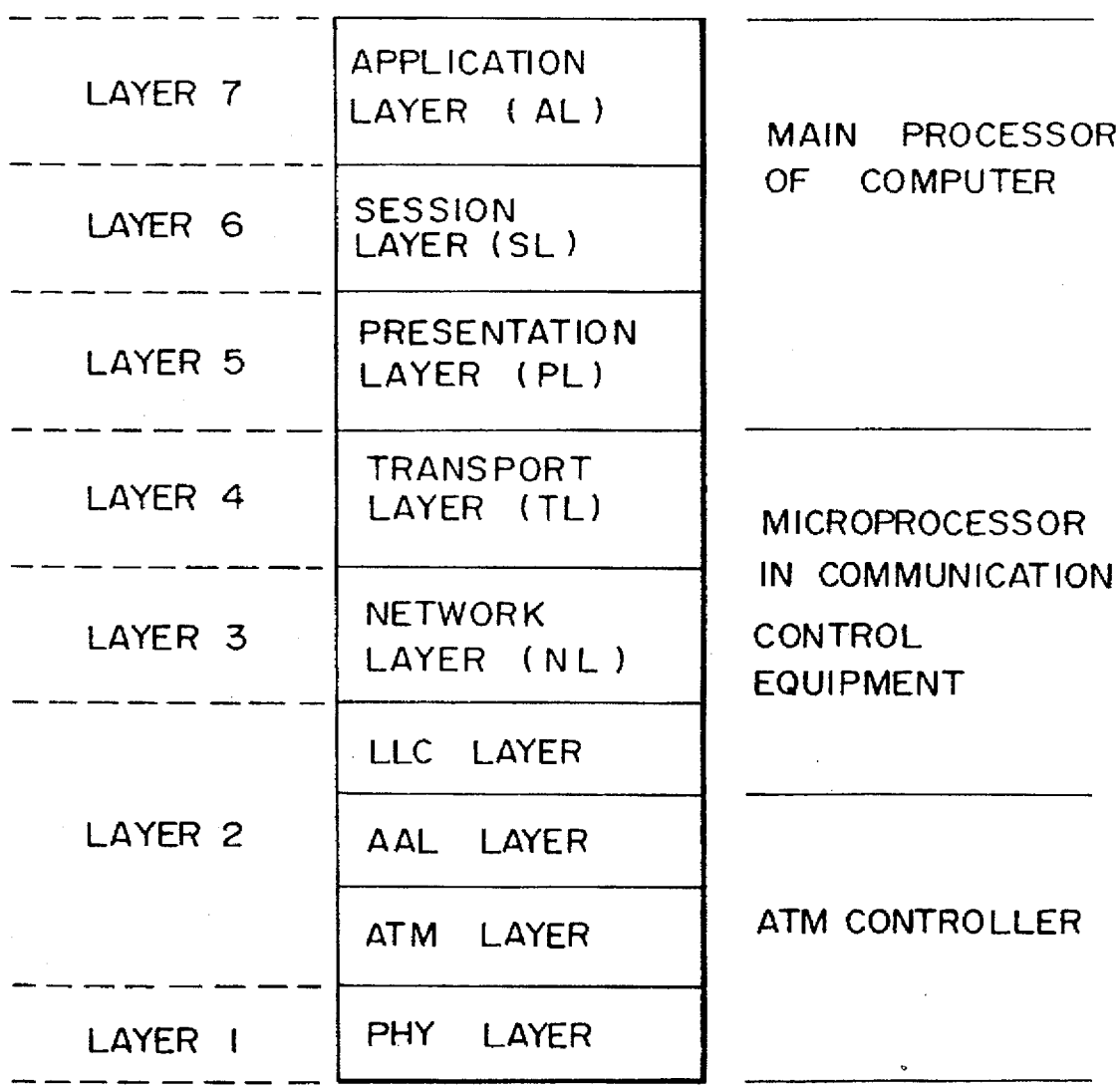
FIG. 3 is a diagram illustrating layers in the protocol.

FIG. 3 is a diagram showing layers in the communication protocol allotted to and performed by the computer 1 and the communication control equipment 2. In the embodiment, processes positioned above a layer 5 (presentation layer PL) in a 7-layer model of OSI are performed by the main processor of the computer, processes positioned from a layer 4 (transport layer TL) to a layer 2 (LLC layer) are performed by the microprocessor 10 in the communication control equipment 2, and processes positioned in a layer 2 (below AAL layer) are performed by the ATM controller 60.

FIG. 4 shows a format of communication frames to be transmitted and received among a plurality of communication control equipments.

Transmission data 41 from the computer is added with TL header 42-3, NL header 42-2 and LLC header 42-1 by the microprocessor 10 to form LLC frame 42. The ATM controller 60 adds trailer 43-1 to the frame 42 and then divides the transmission frame into a plurality of data (hereinafter referred to as payload) 46 having the length of 48 bytes. Each of the pay loads 46 is added with ATM header 45 and is transmitted to the transmission path 7 as a cell 44. Cells received from the transmission path are subjected to the procedure opposite to that in the transmission process to assemble a frame.

An ATM network constituted by the ATM switching system 3 and the ATM transmission paths 7 is a connection type network and an ATM connection is identified by a combination of two parameters VPI 47 and VCI 48 provided in the ATM header 45.

FIGS. 5A to 5H show main header formats of TP4, CLNP and LLC types 1 used mainly in the LAN environment in protocol of the layer 4 to the layer 2 (LLC sub-layer) of OSI protocol processed by the microprocessor 10.

Figure 6:
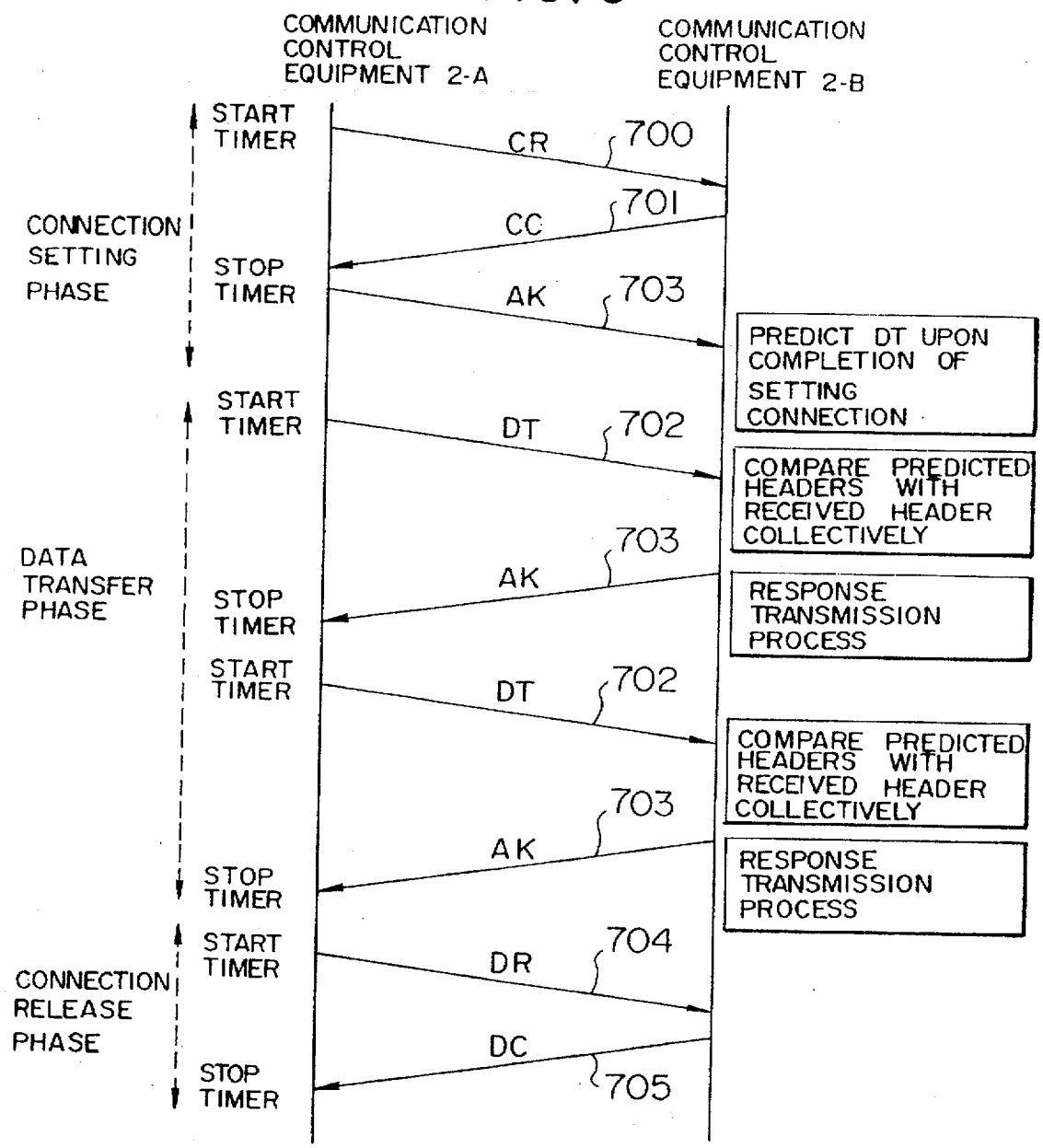
FIG. 6 is a diagram showing a communication sequence of the transport protocol.

FIG. 6 shows an example of the procedure of the timer process in a data transmission station (communication control equipment 2A) pertinent to the present invention and the header prediction process in a data reception station (communication control equipment 2B) performed by using the communication sequence of the OSI transport protocol (TP4).

When the data transmission station transmits a DT packet 702 for confirmation of transmission of transmission data, the timers are started and when an AK packet 703 is returned to the data transmission station, the timer corresponding to the AK packet is stopped. On the other hand, when the data reception station completes setting of connection, the data reception station predicts headers for the DT packet 702 and when the data reception station receives the DT packet 702, the received header is compared with the previously predicted headers. When the received header is coincident with the previously predicted header, the data reception station judges that the received data is correct reception data and returns an AK packet 703.

The above sequence occurs in a unit of connection. Accordingly, the function of controlling a multiplicity of timers and the function of retrieving a header coincident with the received header from a number of prediction headers at a high speed are required in the environment in which a multiplicity of connections are set.

The protocol processing accelerator 50 provided in the communication control equipment 2 is hardware for accelerating the timer control and header retrieving processes increased with the number of connections. The function of the protocol processing accelerator 50 is now described in detail.

Figure 7:
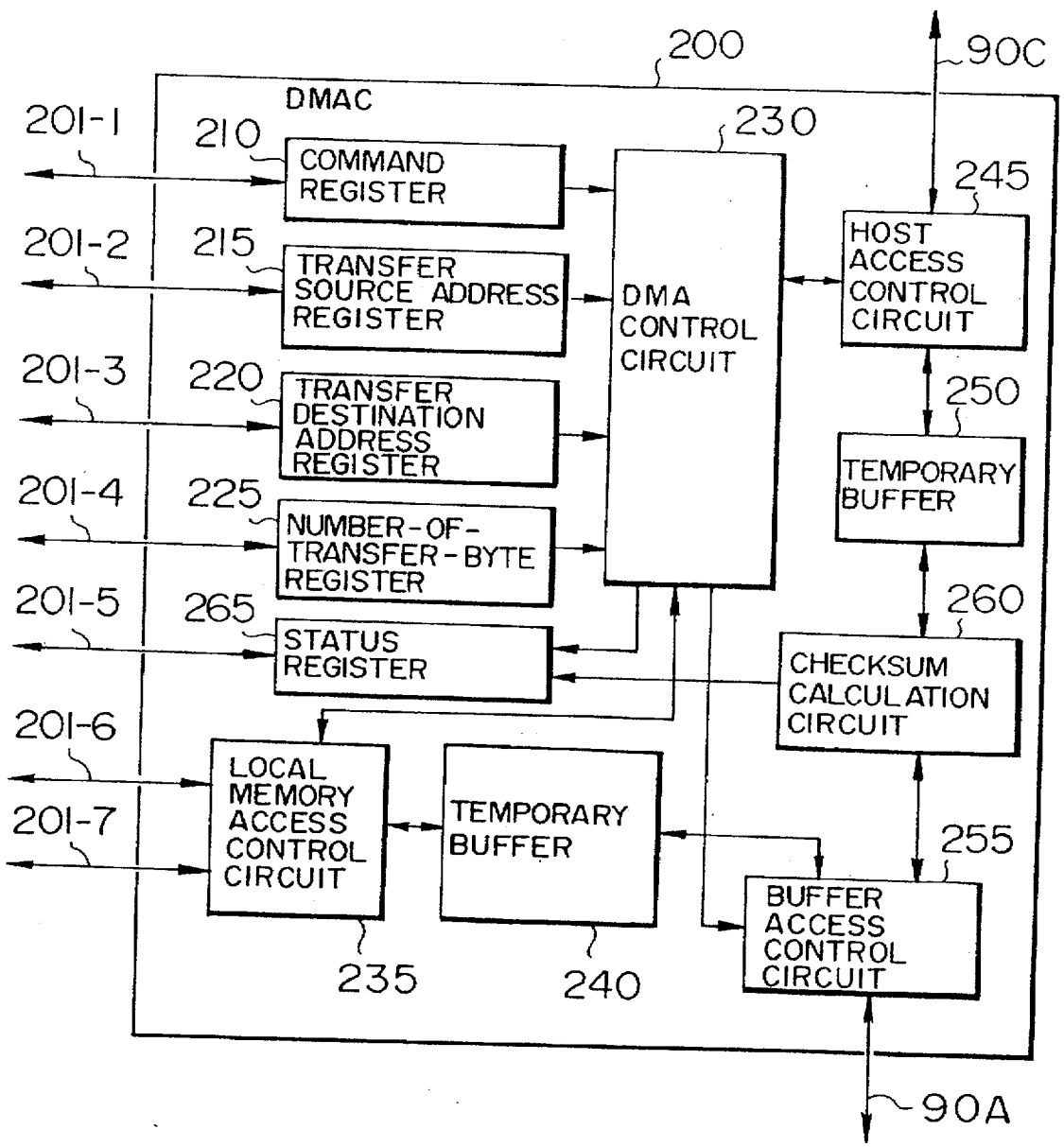
FIG. 7 is a block diagram schematically illustrating a DMAC.

FIG. 7 is a block diagram schematically illustrating the DMAC 200.

The DMAC 200 possesses the data DMA function of transferring transmission and reception data between the main memory 5 in the computer 1 and the buffer memory 40 and the header DMA function of transferring the protocol header between the local memory 30 and the buffer memory 40 as described above.

The DMAC 200 includes a command register 210 for storing a start command to the DMAC 200 set by the microprocessor 10, a transfer source address register 215 for storing a memory address of a transfer source, a transfer destination address register 220 for storing a memory address of a transfer destination, a number-of-transfer-byte register 225 for storing the number of transfer bytes, a DMA control circuit 230 for controlling operation of the whole DMAC 200, a host access control circuit 245 for controlling access to the main memory 5 of the computer 1, a local memory access control circuit 235 for controlling access to the local memory 30, a buffer access control circuit 255 for controlling access to the buffer memory 40 through the buffer access arbiter circuit 500, a temporary buffer 240 for temporarily holding data transferred between the local memory 30 and the buffer memory 40, a temporary buffer 250 for temporarily holding data transferred between the main memory 5 and the buffer memory 40, a checksum calculation circuit 260 for calculating a checksum for data transferred between the main memory 5 and the buffer memory 40, and a state register 265 for holding a completion result of the DMA transfer and a calculation result of the checksum.

When the DMAC 200 performs the data DMA, the host access control circuit 245 and the buffer access control circuit 255 are operated independently of each other and the respective accesses are performed in the pipeline manner. The temporary buffer 250 absorbs a difference between the respective memory access speeds. This is the same even for the header DMA function and the temporary buffer 240 absorbs a difference between the access speed to the local memory 30 and the access speed to the buffer memory 40. Information for designating a distinction indicative of the data DMA request or the header DMA request and the direction of DMA transfer is set in the command register 210.

Figure 8:
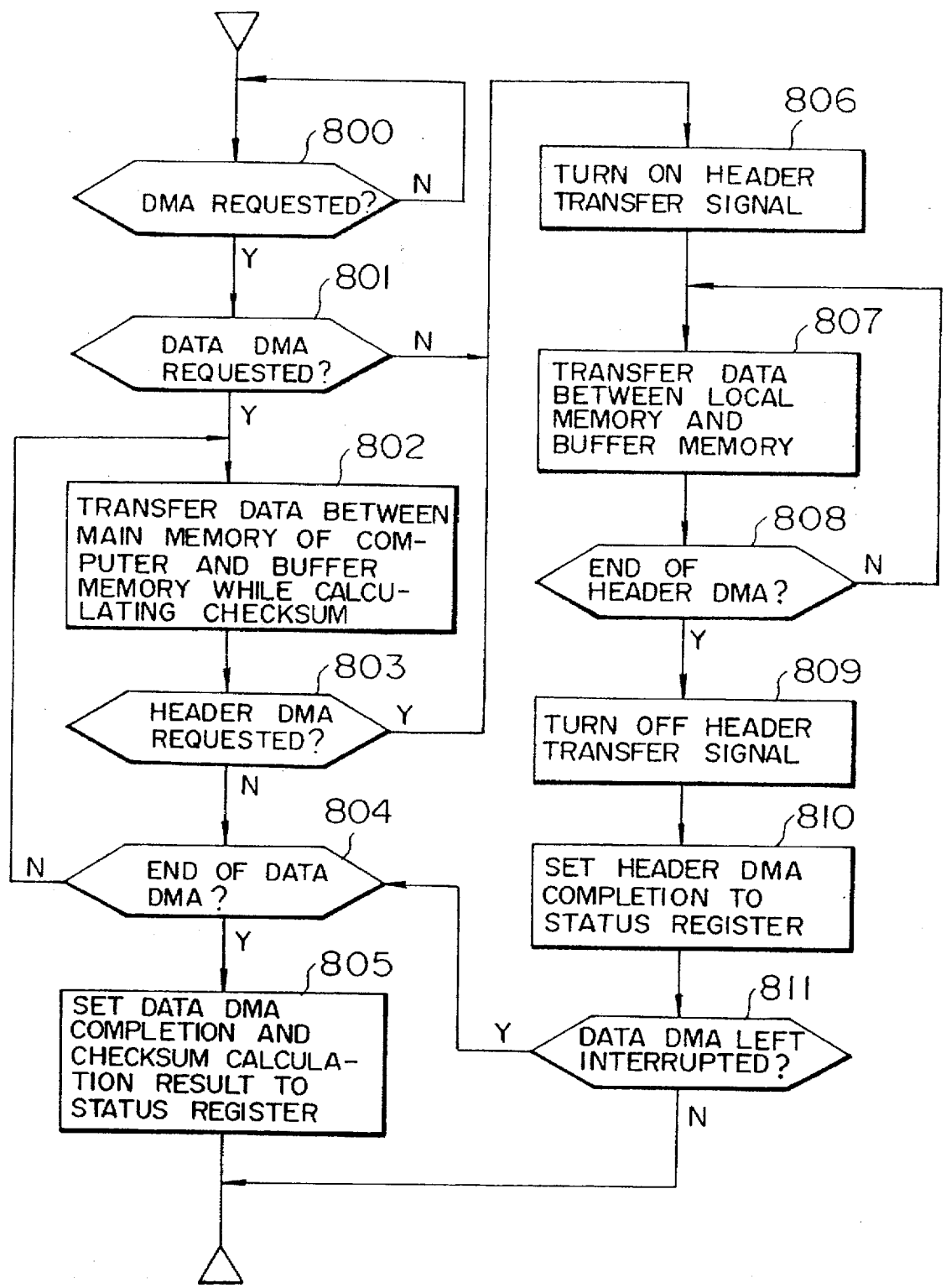
FIG. 8 is a flow chart showing operation of the DMAC.

FIG. 8 is a flow chart showing operation of the DMAC 200.

When the DMAC 200 receives the DMA request from the microprocessor 10 (step 800), the DMAC 200 judges whether the request is the data DMA request or the header DMA request (step 801). When it is the data DMA request, the DMA transfer of one word is performed between the main memory 5 and the buffer memory 40 in the designated transfer direction. At the same time, the checksum for the transferred data is calculated (step 802). When the transfer of one word is completed, whether a new header DMA request is present or not is judged (step 803). When the header DMA request is present, operation of the data DMA is interrupted in order to perform the header DMA transfer preferentially and the process proceeds to step 806. In step 803, when the header DMA request is not present, the data DMA transfer is continued and steps 802 and 803 are repeatedly performed until the DMA transfer for the number of designated bytes is completed (step 804).

When the data DMA transfer is completed, the data DMA completion notice and the checksum calculation result are set in the state register 265 and the DMA completion is notified to the microcomputer 10 (step 805). In steps 801 or 803, when the header DMA request is detected, a header transfer signal 201-6 is turned on (step 806) and data for the number of designated bytes is transferred between the local memory 30 and the buffer memory 40 (steps 807 and 808). When the header DMA transfer is completed, the header transfer signal 201-6 is turned off (step 809) and header DMA completion is set to the state register 265 (step 810). When the header DMA transfer is completed, whether or not the data DMA transfer is left interrupted is examined (step 811). When the data DMA transfer is left interrupted, the process is returned to step 804 and the data DMA transfer is performed again.

As apparent from the flow chart, the header DMA transfer has a higher priority than the data DMA transfer and when the header DMA request is issued during the data DMA transfer, the data DMA transfer is interrupted temporarily and the header DMA transfer is performed first.

Figure 9:
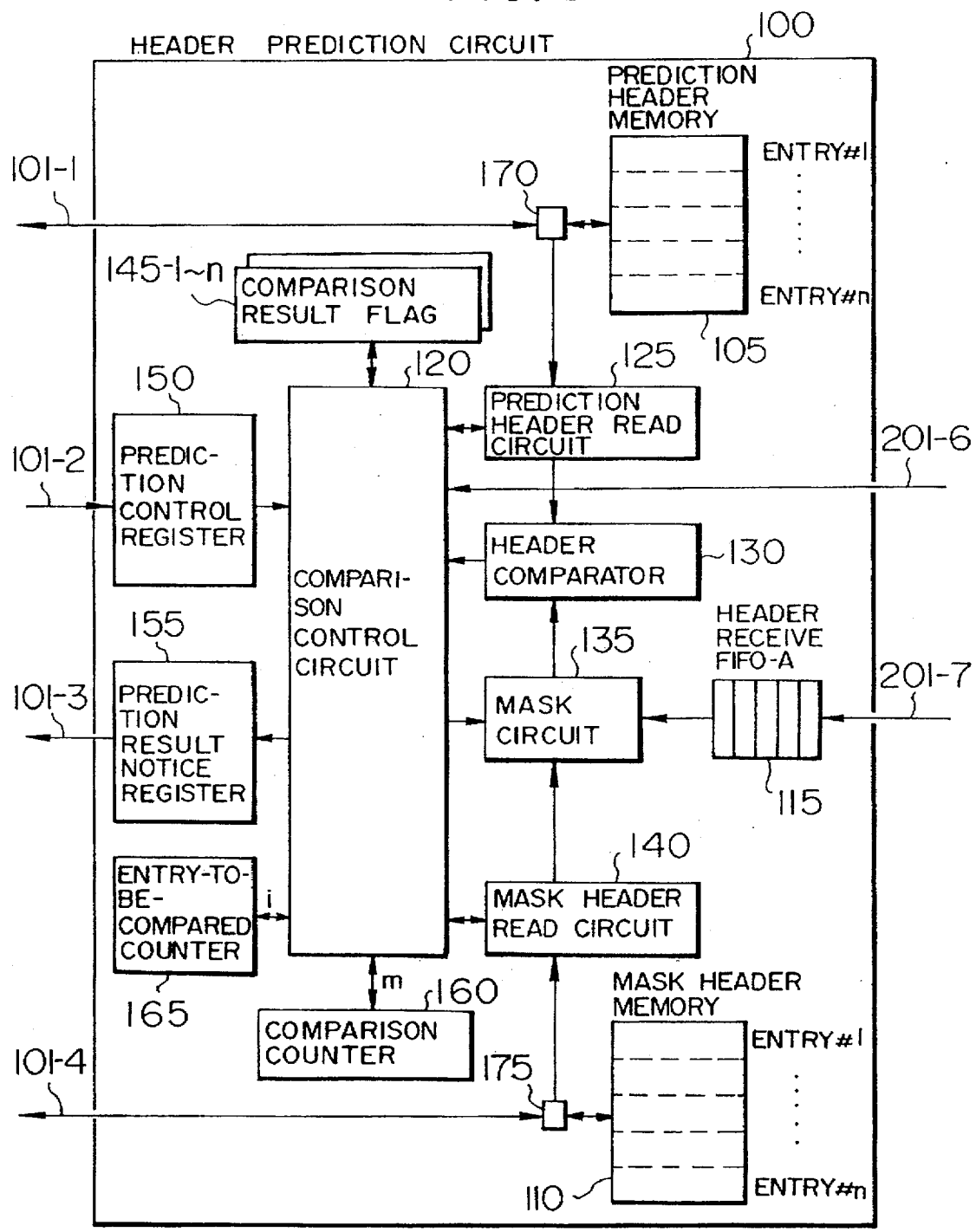
FIG. 9 is a block diagram schematically illustrating a header prediction circuit.

FIG. 9 is a block diagram schematically illustrating the header prediction circuit 100.

As described above, the header prediction circuit 100 is a circuit for taking in the protocol header transferred from the buffer memory 40 to the local memory 30 by means of the DMAC 200 and retrieving a header coincident with the plurality of previously registered prediction headers at a high speed.

The header prediction circuit 100 includes a prediction header memory 105 having a plurality of entries for registering the prediction headers, a mask header memory 110 having a plurality of entries for registering mask headers which prescribe portions other than predicted objects of the prediction headers, a header receive FIFO-A 115 for temporarily holding a received protocol header transferred from the DMAC 200, a prediction header read circuit 125 for taking out the prediction header to be compared, a mask header read circuit 140 for taking out a mask header to be compared, a mask circuit 135 for masking (AND) the contents of the header receive FIFO-A 115 by a mask header, a header comparator 130 for comparing data produced by the mask circuit 135 with the prediction header, a prediction control register 150 in which the prediction headers are registered and for designating an effective entry, a comparison result flags 145-1 to 145-n for temporarily holding the comparison results (coincidence or incoincidence) in correspondence to the entries of the prediction header memory 105, a comparison counter 160 for holding a word position m to be compared with respect to the received protocol header, an entries be-compared counter 165 for holding a number i of entries to be compared with the received header, a predicted result notice register 155 for notifying the predicted result (comparison result) to the microprocessor 10, and a comparison control circuit 120 for controlling operation of the whole prediction circuit 100.

The prediction header memory 105 and the mask header memory 110 are configured to be able to be directly accessed from the microprocessor 10. Access arbiter circuits 170 and 175 function to arbitrate accesses from the microprocessor 10 and the header prediction circuit 100.

Figure 10:
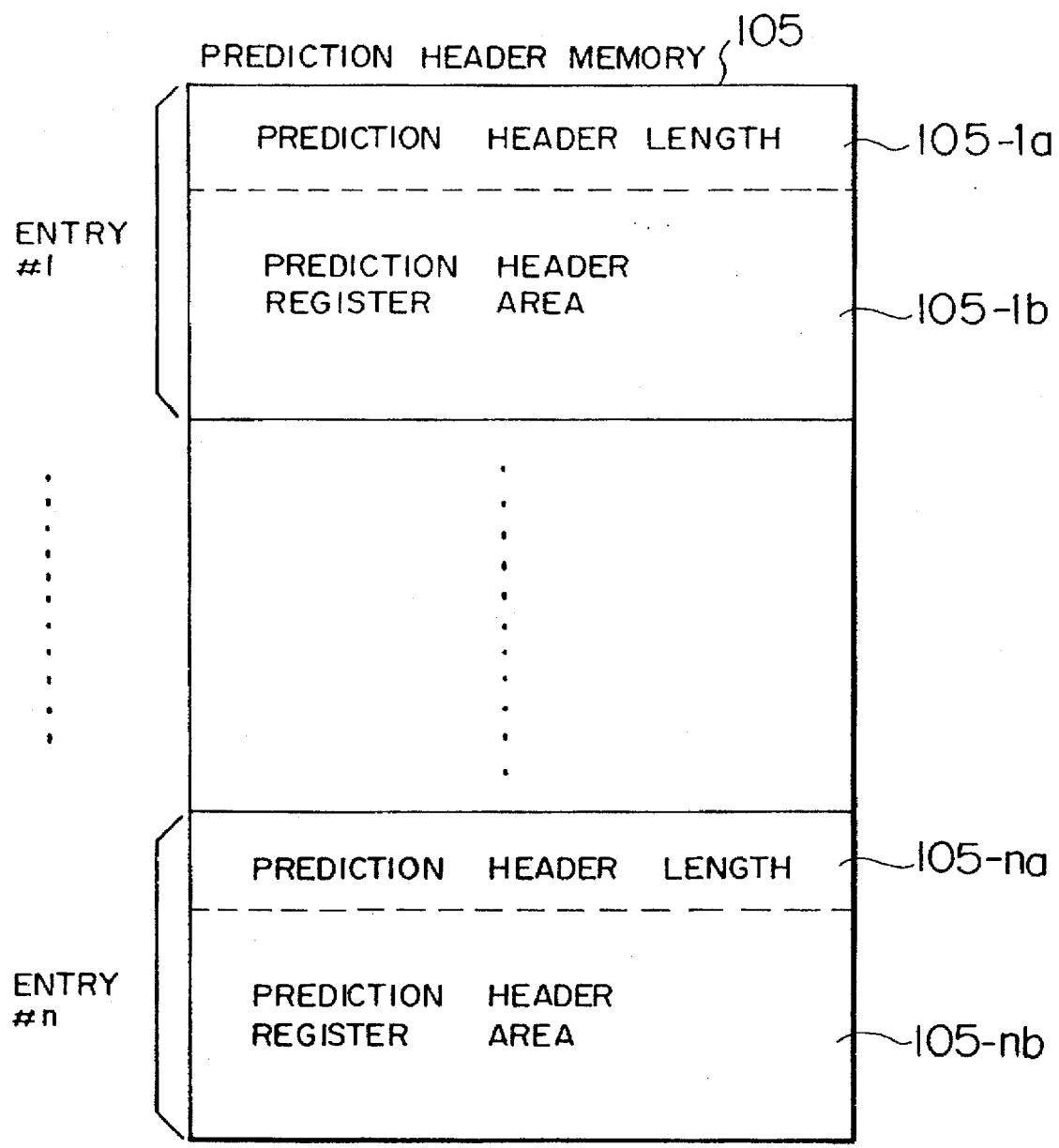
FIG. 10 is a diagram showing a structure of a table formed in a prediction header memory.

FIG. 10 shows a data structure of the prediction header defined in the prediction header memory 105.

The prediction header memory includes a plurality of entries, each of which includes a prediction header length 105-1a for designating the length of the predicted protocol header and a prediction header register area 105-1b for registering the predicted protocol header.

The mask header memory 110 having the same data structure and a mask pattern incapable of being predicted previously and for prescribing a field not to be compared with the header of the received frame is set in a field corresponding to the prediction header register area 105-1b. For example, "1" is set in a bit corresponding to a portion to be compared and "0" is set in a bit corresponding to a portion not to be compared.

Figure 11:
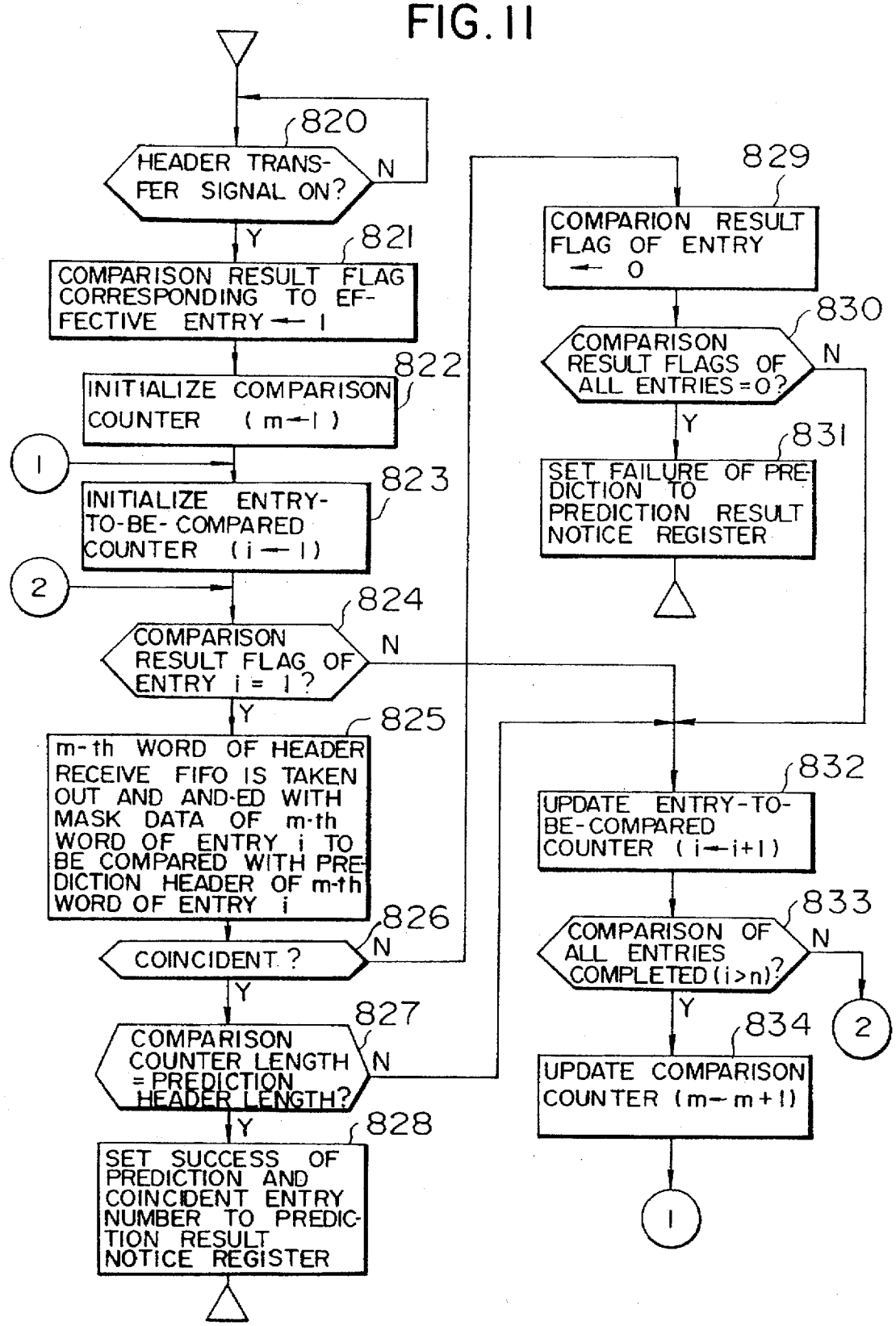
FIG. 11 is a flow chart showing operation of the header prediction circuit.

FIG. 11 is a flow chart showing operation of the header prediction circuit 100.

When the header prediction circuit 100 detects an ON state of the header transfer signal 201-6 from the buffer memory 40 to the local memory 30 by means of the DMAC 200 (step 820), the initialization is performed in steps 821 to 823 for the subsequent comparison retrieval process. More particularly, in step 821, "1" is set in the comparison result flag 145 corresponding to an effective entry in which the prediction header is registered. In step 822, "1" is set in the comparison counter 160 indicative of the word position m for comparison. In step 823, "1" is set in the entry-to-be-compared counter 165 representative of the entry i to be compared with the received header.

After the completion of the above initialization, the retrieval process is started. First of all, the comparison result flag 145-i for the entry i is examined (step 824) and when the flag is "1", it is judged that it is an entry which is coincident with the received header in the comparison so far and the comparison process is performed. More particularly, an m-th word of the header receive FIFO-A 115 is taken out and is ANDed with a mask header of an m-th word of the entry i. The result of the AND is compared with the prediction header of the m-th word of the entry i (steps 825 and 826).

As the result of the comparison, when the contents of the header are coincident with each other, the value m of the comparison counter 160 is compared with the prediction header length 105-ia of the entry i to thereby examine whether the comparison for the prediction header is completed or not (step 827). When the comparison is completed, information indicating that the prediction is successful and the coincident entry number i is set in the prediction result notice register 155 and the completion of prediction is notified to the microprocessor 10.

In step 824, when the comparison result flag 145-i for the entry i is "0", it is judged that the entry is an entry that has already failed in the prediction and the value i of the entry-to-be-compared counter 165 is updated (step 832). Whether the comparison with the prediction header of the whole entries has been completed or not is examined for the m-th word of the received header (step 833). When it is not completed, the process proceeds to step 824 and the comparison for the next entry is performed.

In step 833, when the comparison with the prediction header of all entries is completed, the value m of the comparison counter 160 is updated (step 823) and the process is returned to step 823 to perform the comparison process from the first entry. In step 826, when the received header is not coincident with the prediction header, "0" is set to the comparison result flag 145-i of the entry i and it is excluded from the object to be compared (step 829). As a result of the step 829, when the comparison result flags 145 of all entries do not become "0" (step 830), it is judged that all prediction headers are not coincident with the received header and a signal indicative of the failure of prediction is set to the prediction result notice register 155 to notify the completion of prediction to the microprocessor 10 (step 831).

Figure 12:
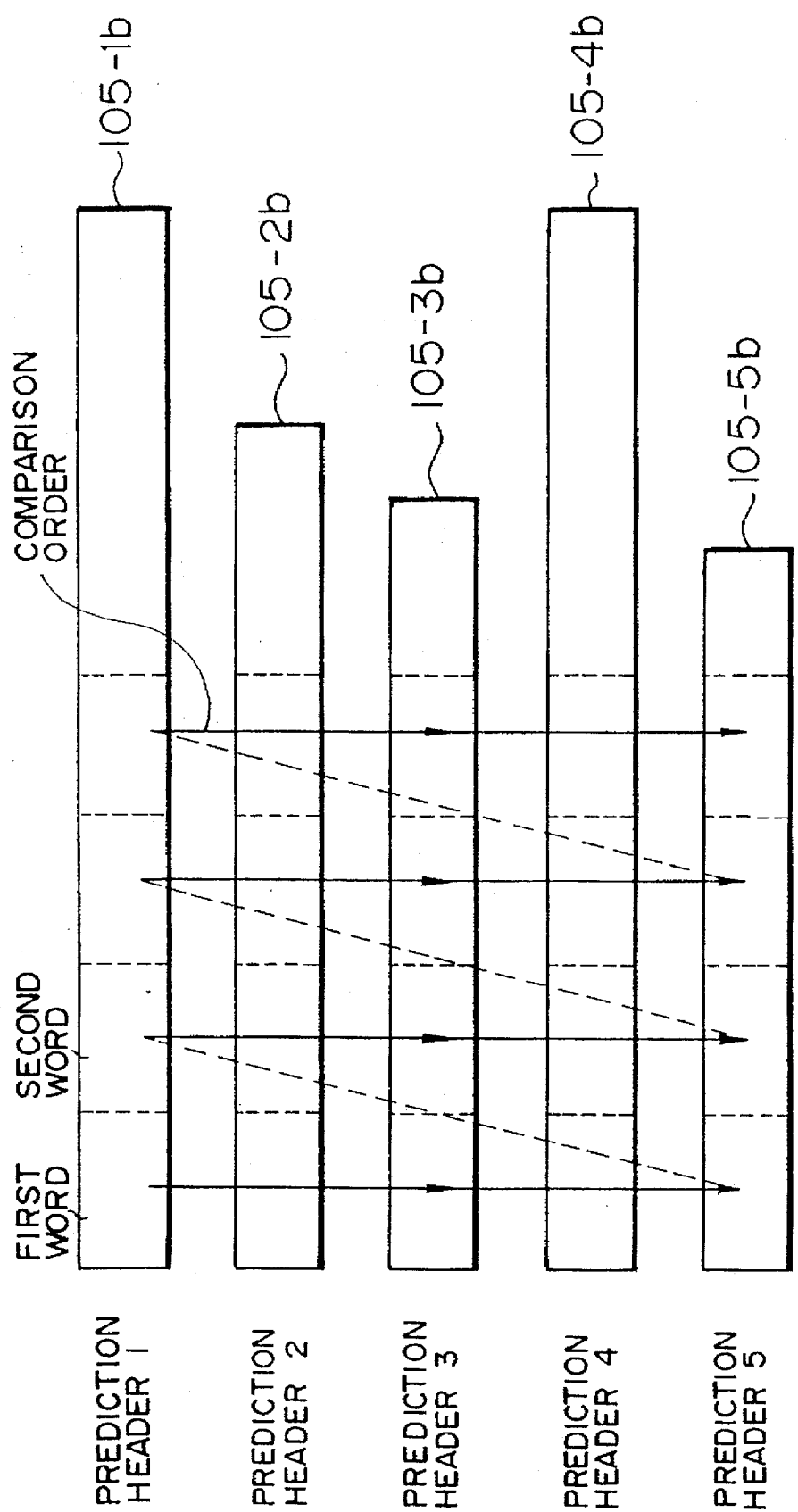
FIG. 12 is a diagram showing the comparison order of the prediction header and received header.

FIG. 12 shows a comparison order of the protocol header of the received frame and the plurality of prediction headers in the above flow chart.

The comparison process is started when the first word of the protocol header transferred from the buffer memory 40 to the local memory 30 is stored in the header receive FIFO-A 115 and is compared in the order of "entry 1→entry 2→entry 5" for one word of the received header. When the last entry is reached, the comparison for the second word is performed. Thereafter, the comparison and retrieval process is performed in the same procedure and is repeated until all prediction headers are not coincident or a coincident prediction header is detected.

The protocol processing procedure in reception of the frame using the DMAC 200 and the header prediction circuit 100 is now described.

Figure 13:
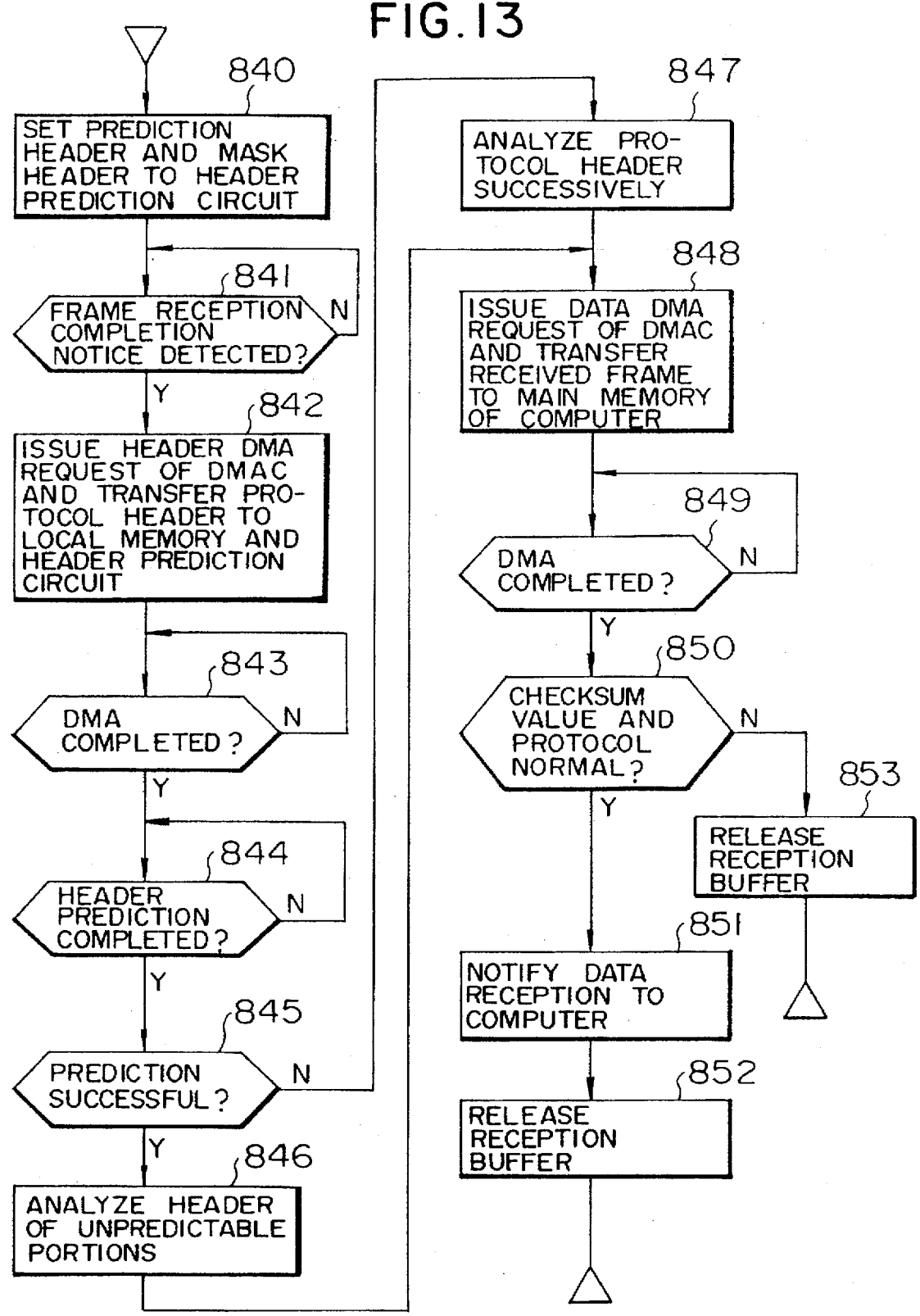
FIG. 13 is a flow chart showing operation of the communication control equipment in data reception.

FIG. 13 is a flow chart showing a program upon reception of a frame in the microprocessor 10.

When setting of the connection between the communication control equipment 2 is completed, the microprocessor 10 predicts the protocol header for the frame to be next received and registers the prediction header and the mask header in the header prediction circuit 100 (step 840).

When the reception completion notice of the frame from the ATM controller 60 is detected (step 841), the header DMA request is issued to the DMAC and the protocol header for the frame received in the buffer memory 40 is transferred to the local memory 30 (step 842).

When the DMA transfer is completed (step 843), the prediction completion notice from the header prediction circuit 100 is awaited (step 844). When there is a prediction completion notice, the predicted result is examined (step 845). When the prediction is successful, only the headers of the previously unpredictable portions of the received protocol headers transferred to the local memory 30 are analyzed (step 846). When the prediction is unsuccessful, the received headers transferred to the local memory 30 are analyzed successively (step 847).

When the analysis of the headers is completed, the data DMA request is issued to the DMAC 200 and the received data except the protocol headers are transferred to the main memory 5 (step 848). When the DMA transfer is completed (step 849), the calculated result of the checksum for the received data is taken out from the state register 265 in the DMAC 200 and the normality of the checksum value and the protocol is examined (step 850). In step 850, when the abnormality is not detected, the data reception is notified to the computer 1 (step 851) and the reception buffer in the buffer memory 40 is released (step 852). In step 850, when the abnormality is detected, the reception buffer is released and the received data is abolished (step 853).

Figure 14:
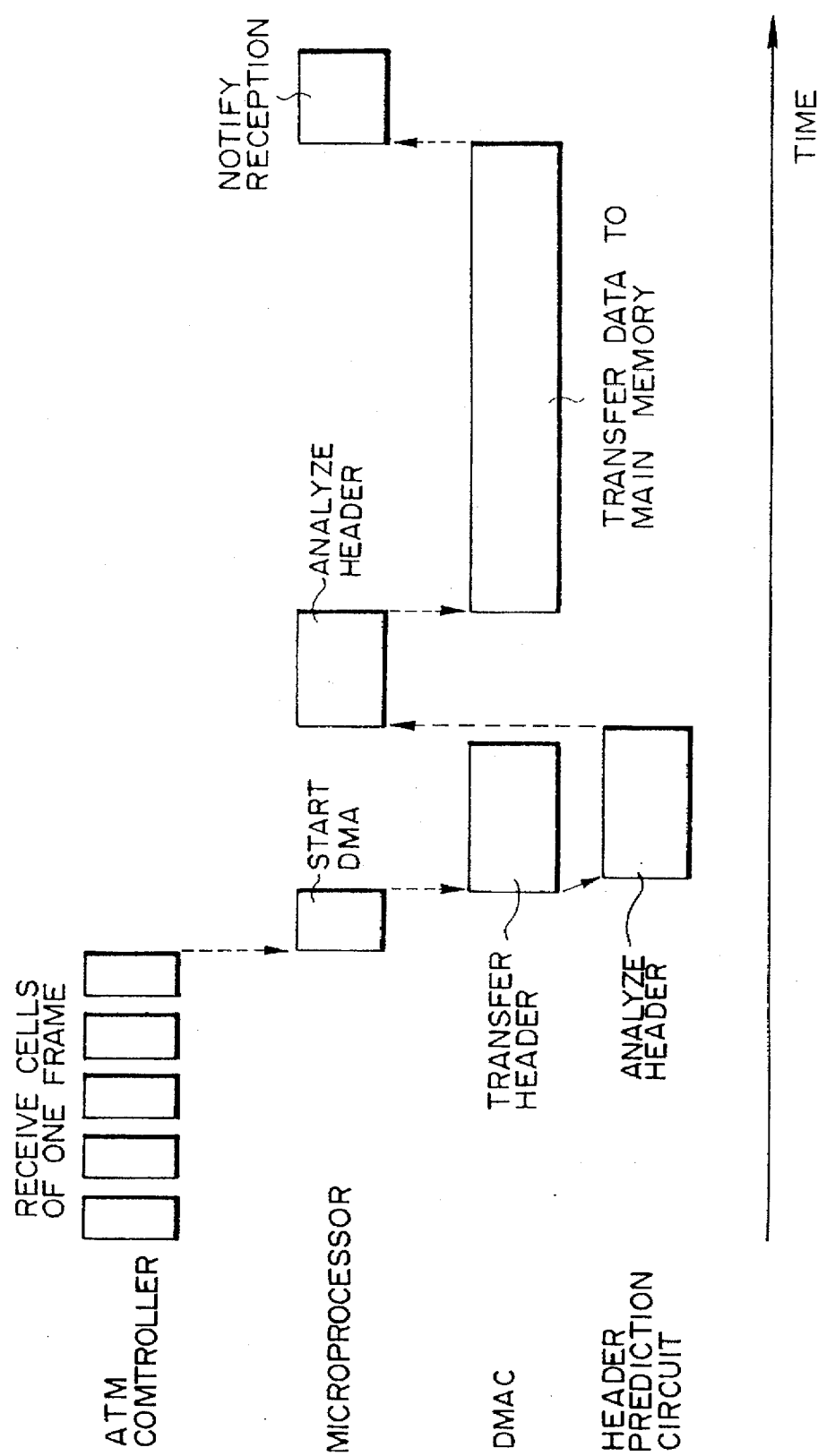
FIG. 14 is a timing chart for explaining operation of the communication control equipment in data reception.

FIG. 14 is a timing chart showing operation of the communication control equipment 2 in the frame reception on the basis of the above flow chart.

As shown in FIG. 14, the protocol header is analyzed by the header prediction circuit 100 while the received protocol header is transferred to the local memory 30 by means of the DMAC 200.

As apparent from the foregoing description, even when the multiplicity of connections are set, the comparison of the plurality of prediction headers and the received header is performed by the header prediction circuit 100 at a high speed. In the embodiment, the header prediction circuit 100 includes only one header comparator 130 for comparing the received header and the prediction headers, while a plurality of header comparators may be provided to compare the plurality of prediction headers with the received header at the same time.

Figure 15:
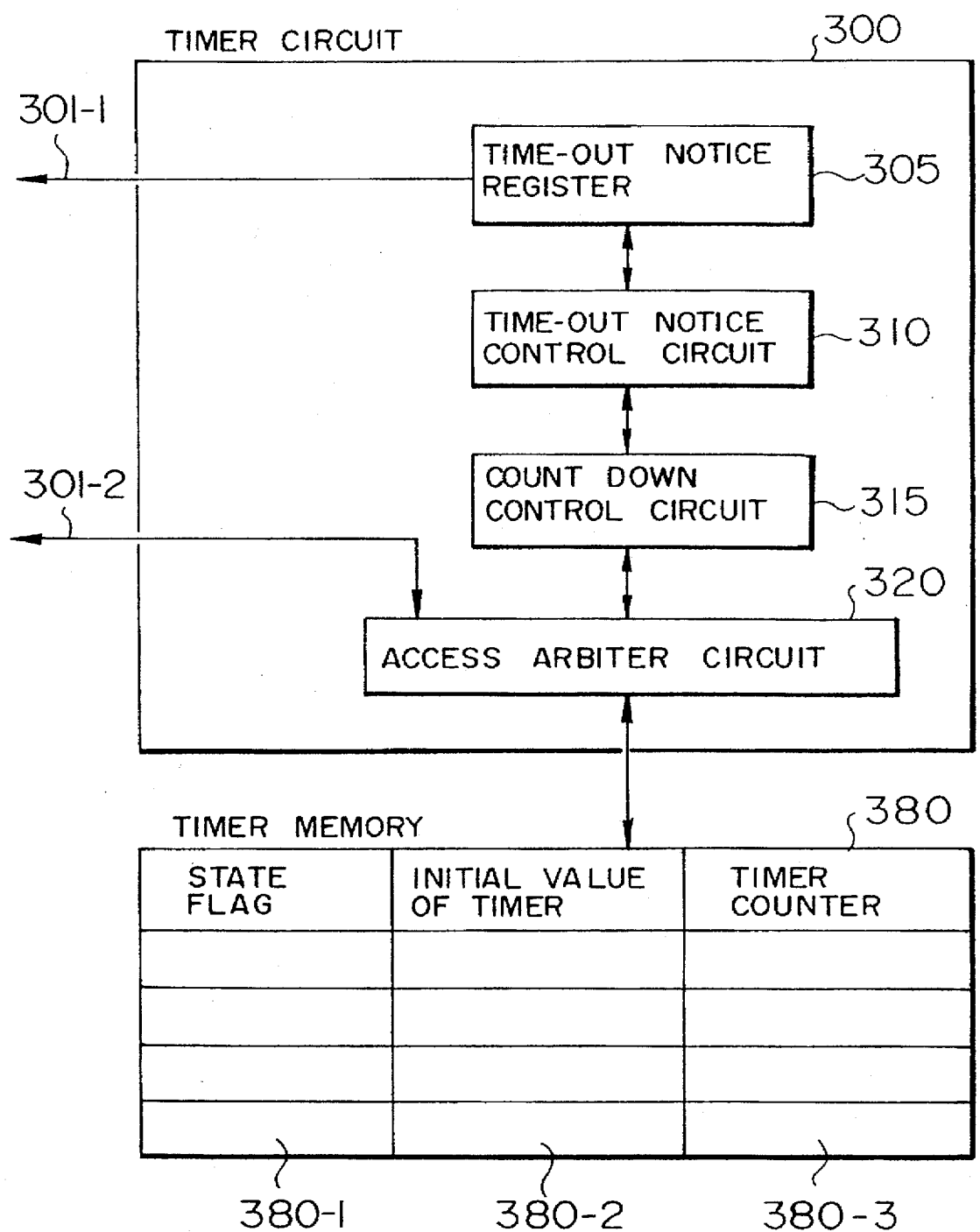
FIG. 15 is a block diagram schematically illustrating a timer circuit.

FIG. 15 is a block diagram schematically illustrating the timer circuit 300 for controlling the multiplicity of timers.

The timer circuit 300 is connected to the timer memory 380 for holding state information relative to the plurality of timers. A plurality of timer entries each corresponding to each of the timers are defined in the timer memory 380. The timer entry includes a state flag area 380-1 indicative of a state of the timer, a timer initial value area 380-2 for holding an initial value of the timer, and a timer counter area 380-3 for holding a value of timer at that time. The timer memory 380 is adapted to be able to be accessed from both of the microprocessor 10 and the timer circuit 300.

The timer circuit 300 includes a count down control circuit 315 for counting down the timer counter area 380-3 of the entries, a time-out notice control circuit 310 for notifying a time-out to the microprocessor 10 when the time-out is detected, a time-out notice register 305 for holding the timed-out entry number and an access arbiter circuit 320 for arbitrating the access to the timer memory 380 from the count down control circuit 315 and the microprocessor 10.

Figure 16:
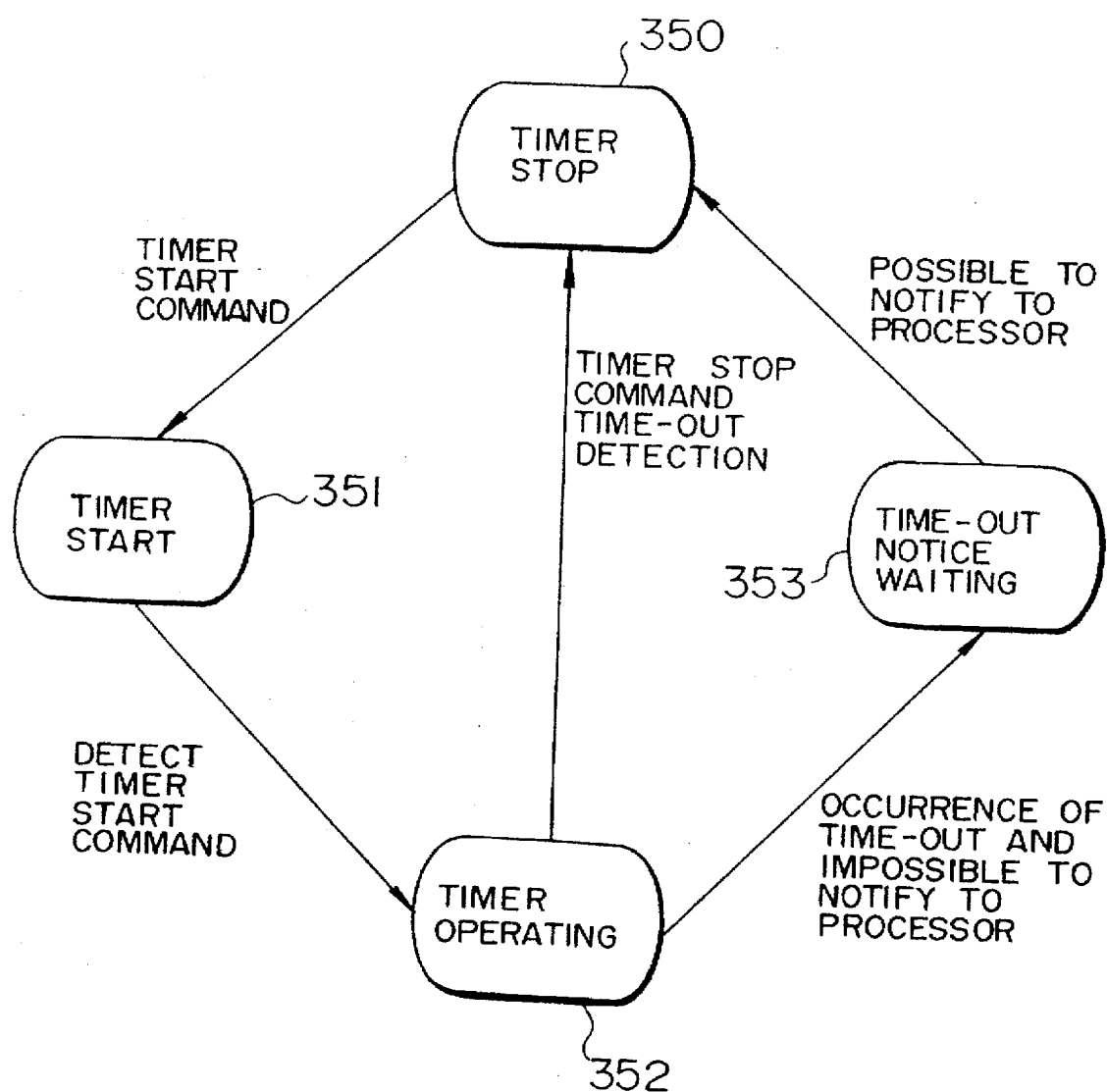
FIG. 16 is a state transition diagram showing operation of the timer circuit.

FIG. 16 is a diagram showing internal states and transition of the states of the timer circuit 300. The timer circuit 300 has four internal states including a timer stop state 350, a timer start state 351, a timer operating state 352, and a time-out notice waiting state 353. Any of the states is held in the state flag area 380-1 of the timer memory 380 for each of the timer entries.

Figure 17:
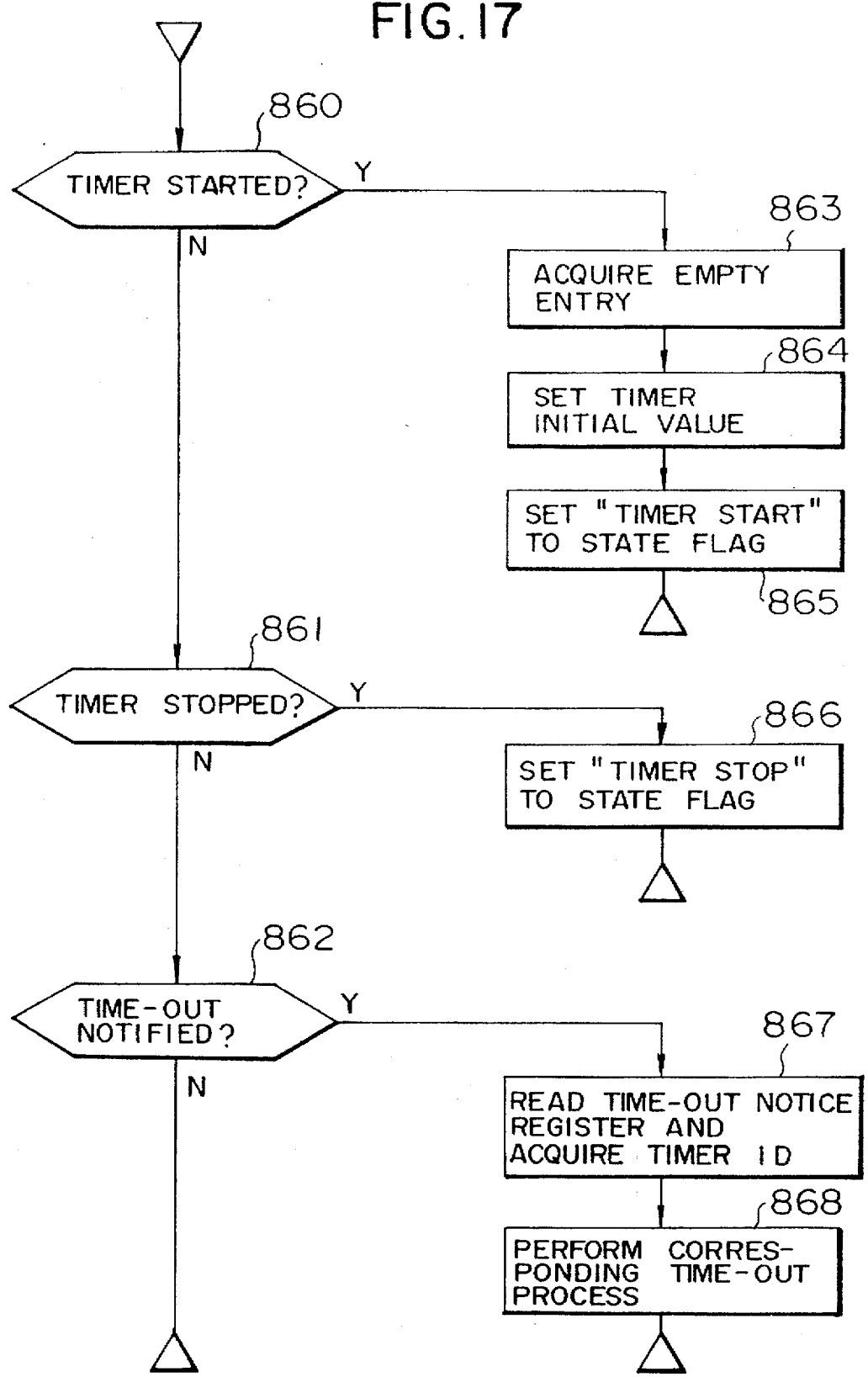
FIG. 17 is a program chart relative to a timer process performed by the microprocessor.

FIG. 17 is a flow chart showing a program relative to the timer control process performed by the microprocessor 10.

The microprocessor 10 acquires an empty entry of the timer memory 380 when the microprocessor wants to start the timer, for example, upon transmission of data (step 863) and sets a timer value to the timer initial value area 380-2 of the entry (step 864). Then, the microprocessor 10 sets a state code indicative of "timer start" to the state flag area 380-1 (step 865). Further, when the microprocessor wants to stop the timer, the microprocessor sets a state code indicative of "timer stop" to the state flag area 380-1 of the corresponding entry (step 866).

When the microprocessor receives a time-out notice described later from the timer circuit 300, the microprocessor reads the time-out notice register 305 to acquire the timed-out timer ID and then performs the time-out process corresponding to the timer (steps 867 and 868).

As apparent from the flow chart, the microprocessor 10 can start the plurality of timers corresponding to the number of timer entries in parallel.

FIG. 18 is a flow chart showing operation of the timer circuit 300.

The timer circuit 300 examines the state flag area 380-1 of one entry of the timer memory 380 for the timer process (step 870). When the "timer start" state is set, the timer circuit 300 sets a value of the timer initial value 380-2 to the timer counter 380-3 (step 875) and then changes the state flag to "timer operating" state (step 876).

When the state flag 380-1 is set to the "timer operating" (step 871), a timer value in the timer counter area 380-3 of the entry is counted down (step 877). When the timer value after the count down is not "0", the above process is repeated for a next entry.

When the timer value is reduced to "0", this state means occurrence of time-out in the timer and the time-out notice control circuit 310 examines whether the time-out notice to the microprocessor 10 is possible or not (step 879). When the time-out notice set to the time-out notice register 305 before is not read by the microprocessor 10, the time-out notice control circuit 310 sets a code indicative of "time-out notice waiting" to the state flag 380-1 of the entry (step 882) and proceeds to the timer process for the entry (step 874).

In step 879, when the contents of the time-out notice register 305 have been already read by the microprocessor 10, the timer ID provided to the entry is set to the time-out notice register 305 (step 880) and the state flag area 380-1 of the entry is changed to the "timer stop" state (step 881).

With respect to the entry having the timer state of "time-out notice waiting" (step 872), whether the notice to the microprocessor 10 is possible in the next process cycle again or not is examined (step 873). When the notice is possible, the process proceeds to step 880 and the time-out is notified (steps 880 and 881). When the notice is impossible, the above timer processing operation is repeated for a next entry (step 874).

When the microprocessor 10 starts the timer, the timer circuit 300 automatically performs the counting operation of the timer and the time-out notice operation as apparent from the above flow chart and accordingly the microprocessor 10 can be released from the processing operation for timer control increased in proportion to the number of started timers to thereby reduce the load greatly.

Constituent elements of the protocol processing accelerator 50 shown in FIG. 1 can be formed as an integrated circuit on the same semiconductor chip by the LSI technique and therefore according to the present invention the high-performance communication control equipment can be realized by a compact hardware structure.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A communication control apparatus for connecting a computer system to a network, comprising:

an interface circuit which provides an interface between said communication control apparatus and said computer system;

a microprocessor for performing communication control processing;

a local memory for storing programs and work data;

a buffer memory for temporarily storing transmission and reception data;

a DMA transfer circuit which performs data transfer between a memory in said computer system and said buffer memory and protocol header transfer between said buffer memory and said local memory;

a network controller for controlling transmission and reception of data to said network;

header retrieval means for predicting a protocol header of a frame to be received next in correspondence to each of a plurality of connections set on said network by said computer system and retrieving a header corresponding to a protocol header of a received frame transferred by said DMA transfer means from said predicted protocol headers;

a protocol analyzer for omitting successive analysis of the protocol header of said received frame in response to a successful retrieval by said header retrieval means, and for executing successive analysis of the protocol header of said received frame in response to an unsuccessful retrieval by said header retrieval means; and a buffer access arbiter circuit for arbitrating accesses to said buffer memory from said DMA transfer circuit and said network controller.

2. A communication control apparatus for connecting a computer system to a network, comprising:

an interface circuit which provides an interface between said communication control apparatus and said computer system;

a microprocessor for performing communication control processing;

a local memory for storing programs and work data;

a buffer memory for temporarily storing transmission and reception data;

a DMA transfer circuit which performs data transfer between a first memory in said computer system and said buffer memory and protocol header transfer between said buffer memory and said local memory;

a network controller for controlling transmission and reception of data to said network;

header retrieval means for predicting a protocol header of a frame to be received next in correspondence to each of a plurality of connections set on said network by said computer system and retrieving a header corresponding to a protocol header of a received frame transferred by said DMA transfer means from said predicted protocol headers;

a protocol analyzer for omitting successive analysis of the protocol header of said received frame in response to a successful retrieval by said header retrieval means, and for executing successive analysis of the protocol header of said received frame in response to an unsuccessful retrieval by said header retrieval means;

a second memory, including a plurality of timer entries, for holding information necessary for timer control to the processor;

a timer which performs timer count operation and timer notifying operation to said processor for the plurality of timer entries of said second memory;

a timer controller for controlling an execution order of the timer notifying operation of a plurality of time-outs when the time-outs occur in entries of said second memory; and a buffer access arbiter circuit for arbitrating accesses to said buffer memory from said DMA transfer means and said network controller.

3. An integrated circuit for communication control, comprising:

first interface means for connecting a higher-rank computer to communication control equipment;

second interface means for connecting said communication control equipment to a network;

third interface means for a buffer memory for temporarily storing transmission and reception data;

fourth interface means for connecting a local bus to a processor of said communication control equipment;

DMA transfer means for performing data transfer between a memory of said higher-rank computer and said buffer memory and performing protocol header transfer between said buffer memory and said fourth interface means;

header retrieval means for retrieving a header corresponding to a protocol header of a received frame transferred by said DMA transfer means from protocol headers predicted corresponding to a plurality of connections set on said network by said computer system;

a protocol analyzer for omitting successive analysis of the protocol header of said received frame in response to a successful retrieval by said header retrieval means, and for executing successive analysis of the protocol header of said received frame in response to an unsuccessful retrieval by said header retrieval means; and output means for outputting an identifier of a retrieved protocol header when retrieval by said header retrieval means is successful.

4. An integrated circuit for communication control according to claim 3, comprising a timer connected between said fourth interface means and an external memory for performing timer count operation to a processor for a plurality of timer entries prepared in said external memory and timer notifying operation to said processor; and a timer controller for controlling an execution order of the timer notifying operation of a plurality of time-outs when the time-outs occur in entries of said external memory.

* * * * *